Dec. 31, 1940.        M. G. KURTH        2,227,264
COMPOUND PACKING
Original Filed Oct. 7, 1935
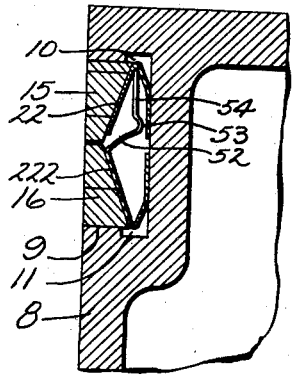
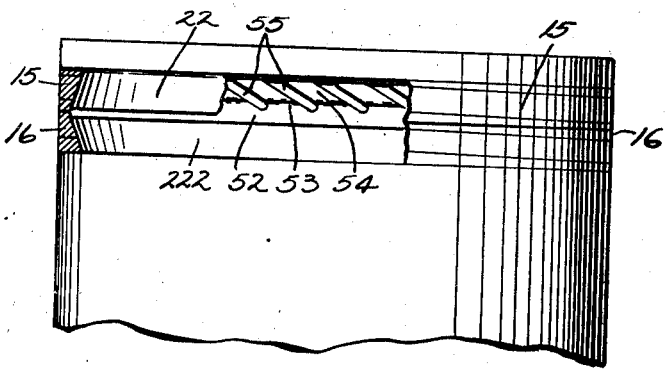
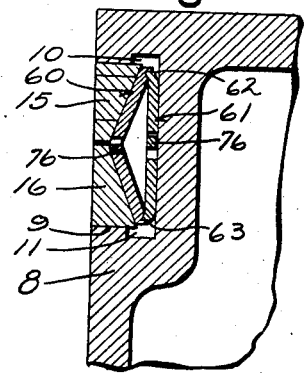
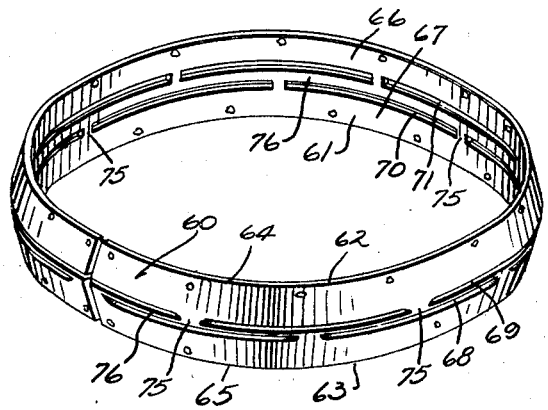
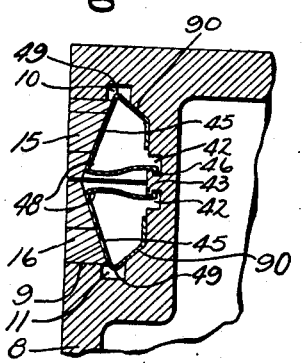
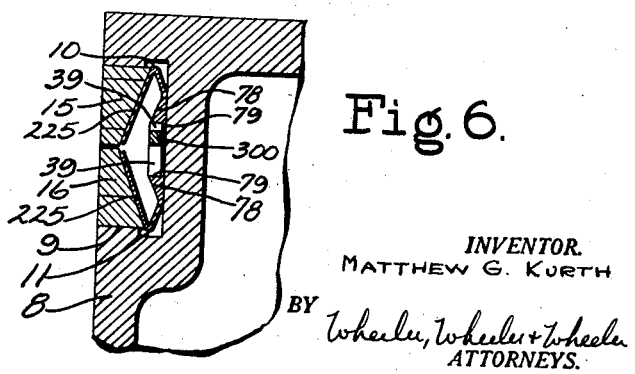
INVENTOR.
MATTHEW G. KURTH
BY Wheeler, Wheeler + Wheeler
ATTORNEYS.

Patented Dec. 31, 1940

2,227,264

UNITED STATES PATENT OFFICE 2,227,264

COMPOUND PACKING

Matthew G. Kurth, Madison, Wis.

Original application October 7, 1935, Serial No. 43,934. Divided and this application April 22, 1938, Serial No. 203,544

14 Claims. (Cl. 309—25)

This invention relates to improvements in compound packing. The present application is a division of my application Serial No. 43,934, filed October 7, 1935, issued Patent No. 2,162,555.

Broadly, as in the above entitled parent application, it is a primary object of the invention to provide an improved and effective packing with maximum effectiveness and minimum cylinder pressure and friction.

The particular object of the present invention is to provide a packing in which the annular packing element is expanded radially by an annular wedge, having an integral or unitary portion which furnishes the axial pressure required for the radial expansion of the packing.

Other objects will appear in more detail from the following disclosure.

In the drawing:

Figure 1 is a fragmentary detail view in axial section, showing improved packing embodying the present invention.

Figure 2 is a view on a reduced scale, partially in cross section and partially in side elevation, showing the installation in a piston of packing of the type shown in Figure 1.

Figure 3 is a view similar to Figure 1, showing a modified embodiment of the invention.

Figure 4 is a view on a reduced scale, showing in perspective the spring expander and wedge unit employed in the construction shown in Figure 3.

Figure 5 is a view similar to Figure 1, showing a further modified embodiment of the invention.

Figure 6 is a view similar to Figure 1, showing a further modified embodiment of the invention.

Like parts are identified by the same reference characters throughout the several views.

The piston shown at 8 will be understood to be typical of any member requiring packing, whether provided with a groove in its internal or external periphery. It will be obvious to those skilled in the art that by simply reversing the curvature of the parts they may be adapted for use in a converse situation as internal packing, in a manner fully equivalent to the exemplification shown.

The piston 8 has a packing groove 9 under-cut at 10 and 11 at both of its ends to provide clearance for the wedge rings hereinafter to be described.

Two packing rings 15 and 16 are used, each of these comprising preferably a helix with end portions and oppositely tapered. Thus, two rings 15 and 16 substantially fill the outer portion of groove 9, as clearly shown in Figures 1, 3, 5 and 6.

Rings 15 and 16 are identical with each other but are used in relatively inverted positions. Each ring is internally beveled to provide a frusto-conical surface with which the wedge members hereinafter to be described are arranged to co-act. While various modifications of the packing rings 15 and 16 may be made within the scope of this invention, they have, for convenience, been illustrated uniformly throughout the several views, the present invention being related particularly to the expanding devices and their co-action with the rings 15 and 16.

In each of the various constructions herein disclosed, an annular hollow wedge intervenes between the inner frusto-conical wall of the packing member 15 or 16 and the generally cylindrical opposing wall of the piston or other packed member. In each construction, moreover, there is a spring under compression in a direction axial with respect to the annular wedge devices for forcing the wedge devices apart in an axial direction, thereby subjecting the packing elements to radial pressure. In each instance the wedge provides a sealed joint between the packing member and the member which is packed, having bearing surfaces complementary to the surfaces of said members.

The wedge ring 22 shown in Figures 1 and 2 is made of sheet metal, folded approximately to a V-shape in cross section and rolled into the form of a split ring, having inner and outer webs. The outer web is fitted to and co-acts with the interior beveled surface of the packing helix 15. The inner web flares from the apex for only a portion of its length and then is shaped to substantially cylindrical form to fit the inner wall of the piston adjacent the groove 9.

The co-acting wedge 222 is identical with that above described except that it is made to provide integrally a resiliently expansible spring, which, in the assembly of the parts, is under compression so that its re-action tends to separate the two wedges axially, thereby imposing radial expanding pressure on both of the packing elements 15 and 16.

An annular flange 52 is rolled inwardly on the lower wedge 222 and reversely curved at 53 to increase its resilient yielding characteristics. Thence the flange is extended axially upwardly at 54 in the form of teeth or fingers, as shown in Figure 2, these being preferably formed by helical notches 55. The helical inclination of the fingers 54 gives them a certain degree of increased resilience axially of the tubular flange in which they are formed, and additional resilience is provided by the reverse curve at 53 across which the notches 55 preferably extend. The inclination of the flange portion 52 renders this flange portion likewise resilient.

In the construction shown in Figures 3 and 4 I have illustrated another device in which the spring action and the wedge action are provided integrally in the same members. The construction now being described has the advantage that it may be handled as a unit, the parts being in permanent connection.

To make up this combination spring and wedge expander unit I provide two axially yieldable spring split rings 60 and 61 which are spaced apart intermediate their ends and are peripherally joined at their end margins 62 and 63 by spot welding or the like.

The separation of the middle portions of these rings is preferably accomplished by forming the outer ring 60 in the form of a shallow channel having a frusto-conically finished bearing surface at 64 and a similar surface of opposite taper at 65. The surfaces 64 and 65 are complementary to the inner surfaces of the packing elements 15 and 16 and consequently they serve the functions of the wedges 22.

The resilient axial yielding between the portions 64 and 65 of the outer ring 60, and the corresponding portions 66 and 67 of the inner ring 61 is provided for by peripherally slotting each of the two rings 60 and 61 to provide overlapping kerfs 68, 69, 70 and 71. Between the ends of the kerfs of each series are integral tongues 75, the integral tongues of one series being staggered equi-distant between the tongues of the other series. Between the two series of kerfs remains an unslotted band 76 integral with the upper and lower annular areas but connected therewith solely through the staggered tongues. Thus both the inner ring 61 and the outer ring 60 are axially yieldable.

In the construction shown in Figure 5 each wedge has its own individual integral spring element which forces the wedge axially. The piston is provided with a pair of inward extensions 42 of the groove 9, each such extension being preferably under-cut to provide a rib 43. The annuli 45 are made of spring sheet metal in tubular cross section of the peculiar outline shown in Figure 5. The margin of each is flanged at 46 for engagement behind the appropriate rib 43. The outer periphery of each is frusto-conical in form and substantially rectilinear in cross section as shown in Figure 5, whereby to be adapted to co-act with the beveled inner surface of the helical packing member 15 or 16. The proportions of the parts are such that the angle at 48 has been subjected to material distortion in the assembly of the elements of the compound ring, whereby the stress in the sheet metal tends to force the apex 49 into the under-cut portion 10 or 11 of the groove to produce the desired wedging action for the expansion of the packing helix 15 or 16, as the case may be.

In the construction shown in Figure 6, the spring 300 may comprise a split ring having staggered fingers 39 for transmitting its pressure to the shoulders 79 formed by thickening the portions 78 of the wedge elements 225.

By way of example, I have shown the piston to be provided in Figure 5 with a tapered surface 90 co-acting with the tapered inner portion of the wedge element 45, whereby to increase the radial thrust upon the packing members 15 or 16 resulting from the axial separation of the wedges. This principle may be carried out with regard to each of the various constructions disclosed.

The hollow wedge has an important advantage in that it will operate at low temperature as compared with any solid wedge construction. In actual testing of a heavy engine developing horse power far in excess of that developed by the same engine with other packing, it was found that my improved packing using hollow sheet metal wedge elements remained at a temperature not to exceed 300 degrees F. This is important, because the metals commonly used for piston ring construction do not lose their resilience at such low temperatures. In every one of the constructions disclosed there is an adequate seal which prevents circulation of the hot gases about the spring, and in many constructions the location of the spring within the cavity provided by the hollow wedge provides a dead air space which effectually insulates the spring against the heat.

The packing herein disclosed is highly efficient at radial pressures greatly reduced as compared with other packings. An engine equipped with this packing will show increased power, reduced friction loss, reduced heat, and prolonged packing life.

Moreover, the radial pressures are entirely within the control of the designer. The helical packing has very little spring per se, and the pressure between the helical packing and the cylinder or other surface contacted thereby is almost entirely a function of the axially exerted spring pressure and the angularity of the surface with which the wedge re-acts.

By reason of the fact that the wedge is interposed between the spring and the packing element the packing element will not yield resiliently with sufficient freedom to allow the piston to become laterally displaced in positions where side slap would occur in a piston equipped with conventional packing. The fact that the pressure must be transmitted at right angles through the wedge develops sufficient friction to resist any sudden change of packing position, and therefore substantially eliminates side slap.

I claim:

1. The combination with a pair of peripherally beveled annular packing elements, of a pair of annular channeled wedge members operatively co-acting with said elements, one of said wedge members being integrally provided with spring means engaging the other and biased to press the respective wedge members axially against said packing elements.

2. A packing comprising the combination with a pair of annular packing elements having beveled peripheral surfaces, of wedge and spring means interposed between said surfaces comprising a pair of annular channeled wedges, one of which has a reversely curved flange portion notched to provide fingers engaged in the apex of the channel of the other, said flange portion being stressed in the assembly of the packing, whereby its reaction tends to separate the wedge members in a direction to act on the packing elements.

3. The combination with annular packing elements having beveled surfaces, of a pressure device having wedge portions bearing on said surfaces, and an intermediate portion provided at short intervals with overlapping slots to provide a resiliently yieldable connection between said wedge portions.

4. In a packing, a wedge comprising a hollow annulus of V-shaped cross section, comprising a pair of webs connected at an apex, one of said webs being provided remote from said apex with an annular flange of resilient material constituting a spring.

5. In a packing, a wedge comprising a hollow annulus of V-shaped cross section, comprising a pair of webs connected at an apex, one of said webs being provided remote from said apex with an annular flange of resilient material constituting a spring, said spring being subject to bias in a direction to exert pressure axially upon said annular wedge substantially throughout its peripheral extent.

6. In a packing, a wedge comprising a sheet metal annulus of V-shaped cross section, comprising webs joined at an annular apex and thence diverging axially from said apex, one of said webs being provided at its margin remote from said apex with an integral annular spring flange projecting beneath the other of said webs.

7. The combination with a piston having a packing groove and means providing a seat therein, of packing in said groove having a beveled inner surface opposed to the wall of the piston, a wedge complementary to said surface and wall and confined within said groove, and means constituting a spring flange integral with said wedge engaged under compression on said seat, whereby the bias of said flange tends to force said wedge axially of the piston groove in a direction to exert radial pressure on said packing.

8. A packing comprising a sheet metal wedge of generally V-shaped cross section, comprising a pair of annular webs joined at an annular apex, one of said webs being provided with a resilient integral flange extending axially in a direction opposite to the projection of said apex and provided with a portion reversely curved in cross section, and with inclined notches extending from the margin of said flange across the reverse curved portion thereof, whereby to provide fingers yieldable axially of said wedge toward said apex.

9. In a packing, a wedge assembly comprising a pair of hollow wedge elements each V-shaped in cross section and comprising annular webs joined upon annular apices oppositely directed, one of said webs being provided integrally with a resilient annular flange projecting centrally from the wedge with which it is connected into engagement with the interior of the opposite wedge adjacent the apex thereof.

10. In a packing, a wedge unit comprising a pair of hollow wedge elements having outer wedge faces and oppositely directed apices, and spring means integral with at least one of said elements disposed inside the outer faces of said elements and biased against the other of said elements in a direction tending to separate said elements.

11. In a packing, an expander comprising inner and outer web means formed to constitute oppositely directed wedges of annular form, said web means being spaced to provide a hollow therebetween, and means in the plane of one of said web means for resiliently urging said wedges apart in an axial direction.

12. An expander comprising the combination with inner web means having a substantially cylindrical portion and outer web means joined to said inner web means to provide an apex, of tubular means constituting a spring acting axially on the cylindrical portion of said first mentioned web means independently of said outer web means.

13. An expander comprising the combination with inner web means having a substantially cylindrical portion and outer web means joined to said inner web means to provide an apex, of tubular means constituting a spring acting axially on the cylindrical portion of said first mentioned web means, said tubular means being an integral extension of said first mentioned web means, slotted to provide resiliently yieldable portions.

14. An expander comprising the combination with an inner web means of annular form, of an outer web means of annular form marginally joined to said inner web means and having its intermediate portions spaced therefrom, whereby to constitute opposed annular wedges with oppositely directed apices, each of said web means being provided with a series of slots defining connecting springs intermediate said apices, the material of said web means being resilient and said spring being adapted to accommodate under resilient yielding pressure the contraction of said web means in an axial direction.

MATTHEW G. KURTH.